United States Patent
Lee et al.

(10) Patent No.: US 11,641,021 B2
(45) Date of Patent: May 2, 2023

(54) HUMIDIFIER FOR FUEL CELL

(71) Applicants: HYUNDAI MOTOR COMPANY, Seoul (KR); KIA MOTORS CORPORATION, Seoul (KR)

(72) Inventors: Ju Yong Lee, Suwon-si (KR); Hyun Yoo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 381 days.

(21) Appl. No.: 17/075,975

(22) Filed: Oct. 21, 2020

(65) Prior Publication Data

US 2022/0029180 A1     Jan. 27, 2022

(30) Foreign Application Priority Data

Jul. 21, 2020  (KR) .......................... 10-2020-0089948

(51) Int. Cl.
*H01M 8/04119* (2016.01)
*H01M 8/04828* (2016.01)

(52) U.S. Cl.
CPC ..... *H01M 8/04149* (2013.01); *H01M 8/0485* (2013.01); *H01M 8/04835* (2013.01); *H01M 2250/20* (2013.01)

(58) Field of Classification Search
CPC ......... H01M 8/04149; H01M 8/04835; H01M 8/0485; H01M 2250/20
USPC ......................................................... 261/44.5
See application file for complete search history.

(56) References Cited

U.S. PATENT DOCUMENTS

| 10,668,432 | B2 | 6/2020 | Oh et al. | |
| 10,862,145 | B2 * | 12/2020 | Oh | H01M 8/04141 |
| 11,335,926 | B2 * | 5/2022 | Kim | H01M 8/04149 |
| 11,342,569 | B2 * | 5/2022 | Kim | H01M 8/04149 |
| 2019/0326618 | A1 | 10/2019 | Oh et al. | |
| 2021/0050607 | A1 * | 2/2021 | Kim | H01M 8/2484 |

FOREIGN PATENT DOCUMENTS

| JP | 2008-27674 A | * | 2/2008 | ............. Y02E 60/50 |
| KR | 10-2018-0066418 A | | 6/2018 | |
| KR | 10-2019-0121474 A | | 10/2019 | |

* cited by examiner

*Primary Examiner* — Charles S Bushey
(74) *Attorney, Agent, or Firm* — Lempia Summerfield Katz LLC

(57) ABSTRACT

A humidifier for a fuel cell includes: a housing that includes a moist air supply port through which moist air is supplied, a moist air discharge port through which the moist air is discharged, and an inflow gas supply port through which inflow gas is supplied; a humidification unit provided in the housing to humidify the inflow gas by using the moist air; and a humidification amount adjusting unit to selectively adjust an amount of humidification of the inflow gas by the humidification unit based on a flow rate of the moist air supplied to the moist air supply port, thereby obtaining an advantageous effect of accurately adjusting the amount of humidification based on an operating condition of a fuel cell stack.

20 Claims, 11 Drawing Sheets

HUMIDIFIER FOR FUEL CELL

CROSS-REFERENCE TO RELATED APPLICATION

This application claims priority to and the benefit of Korean Patent Application No. 10-2020-0089948, filed on Jul. 21, 2020, the entire contents of which are incorporated herein by reference.

FIELD

The present disclosure relates to a humidifier for a fuel cell, and more particularly, to a humidifier for a fuel cell, which is capable of accurately adjusting an amount of humidification based on an operating condition.

BACKGROUND

The statements in this section merely provide background information related to the present disclosure and may not constitute prior art.

A fuel cell system refers to a system that continuously produces electrical energy by means of a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine.

The hydrogen vehicle is configured to produce its own electricity by means of a chemical reaction between hydrogen and oxygen and to travel by operating a motor. More specifically, the hydrogen vehicle includes a hydrogen tank ($H_2$ tank) configured to store hydrogen ($H_2$), a fuel cell stack configured to produce electricity by means of an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

Meanwhile, an electrolyte membrane of a membrane electrode assembly needs to be maintained at a predetermined humidity or higher in order to normally operate the fuel cell, and thus inflow gas may be humidified by a humidifier before being introduced into the fuel cell stack.

Recently, a method of humidifying inflow gas (dry air), which passes through the humidifier, by using moist air discharged from the fuel cell stack has been proposed.

In addition, a degree of humidification of the inflow gas needs to be adjusted based on an operating condition (or a humidified state) of the fuel cell stack.

However, we have discovered that in the related art, the humidity of the fuel cell stack needs to be adjusted by introducing the inflow gas, which is humidified by the humidifier (humidified state), into the fuel cell stack or by introducing the inflow gas directly into the fuel cell stack through a separately provided bypass flow path without allowing the inflow gas to pass through a humidification space of the humidifier. For this reason, we have found that it is difficult to accurately adjust an amount of humidification of the inflow gas based on the operating condition of the fuel cell stack.

Moreover, because the separate bypass flow path needs to be formed inside (or outside) the humidifier in the related art, the structure is complicated and a degree of design freedom and spatial utilization deteriorate.

SUMMARY

The present disclosure provides a humidifier for a fuel cell, which is capable of accurately adjusting the amount of humidification based on an operating condition of a fuel cell stack.

The present disclosure actively controls the amount of humidification of inflow gas based on a flow rate of moist gas supplied to a humidifier.

In addition, the present disclosure adjusts the amount of humidification of inflow gas based on an operating condition without providing a separate bypass flow path inside (or outside) a humidifier.

Moreover, the present disclosure simplifies a structure and improves a degree of design freedom, spatial utilization, and humidification performance.

The object to be achieved by the exemplary form is not limited to the above-mentioned objects, but also includes objects or effects that may be recognized from the solutions or the exemplary forms described below.

In an exemplary form of the present disclosure, a humidifier for a fuel cell includes: a housing that includes a moist air supply port through which moist air is supplied, a moist air discharge port through which the moist air is discharged, and an inflow gas supply port through which inflow gas is supplied; a humidification unit provided in the housing and configured to humidify the inflow gas by using the moist air; and a humidification amount adjusting unit configured to selectively adjust an amount of humidification of the inflow gas by the humidification unit based on a flow rate of the moist air supplied to the moist air supply port.

This is to accurately adjust an amount of humidification of the humidifier based on an operating condition of a fuel cell stack.

That is, in the related art, the humidity of the fuel cell stack needs to be adjusted by introducing the inflow gas, which is humidified by the humidifier (humidified state), into the fuel cell stack or by introducing the inflow gas directly into the fuel cell stack through a separately provided bypass flow path without allowing the inflow gas to pass through a humidification space of the humidifier. For this reason, it is difficult to accurately adjust an amount of humidification of the inflow gas based on the operating condition of the fuel cell stack. Moreover, because the separate bypass flow path needs to be formed inside (or outside) the humidifier in the related art, the structure is complicated and a degree of design freedom and spatial utilization deteriorate.

However, according to the exemplary form of the present disclosure, the amount of humidification of the inflow gas by the humidification unit may be adjusted based on the flow rate of the moist air supplied into the housing, such that it is possible to obtain an advantageous effect of accurately adjusting the amount of humidification of the inflow gas, which is to be supplied to the fuel cell stack, based on the operating condition of the fuel cell stack.

This configuration is based on the fact that the flow rate of the moist gas supplied to the housing in the fuel cell stack varies depending on the operating condition of the fuel cell stack. Since the amount of humidification of the inflow gas by the humidification unit may be adjusted based on the flow rate of the moist gas supplied to the housing, it is possible to obtain an advantageous effect of accurately adjusting the amount of humidification of the inflow gas based on the operating condition of the fuel cell stack (the flow rate of the moist air).

Above all, according to the exemplary forms of the present disclosure, since the humidification amount adjusting unit actively operates (actively adjusts the amount of humidification of the inflow gas) based on the flow rate of the moist air, it is possible to obtain an advantageous effect of simplifying the structure and the operational structure, more accurately adjusting the amount of humidification of the inflow gas, which is to be supplied to the fuel cell stack, based on the operating condition of the fuel cell stack, and improving humidification performance.

The humidification unit may have various structures capable of humidifying the inflow gas by using the moist air.

For example, the humidification unit may include: a cartridge casing provided in the housing, having, on a first side thereof, a first window through which the moist air is introduced, and having, on a second side thereof, a second window through which the moist air is discharged; and a humidification membrane provided in the cartridge casing and configured to allow the inflow gas to flow along the humidification membrane.

The humidification amount adjusting unit may have various structures capable of adjusting the amount of humidification of the inflow gas by the humidification unit based on the flow rate of the moist air supplied to the moist air supply port.

This configuration is based on the fact that the amount of humidification of the inflow gas by the humidification unit varies depending on (in proportion to) the supply amount of the moist air supplied into the cartridge casing. Since the supply amount of the moist air to be supplied to the cartridge casing may be adjusted by selectively opening or closing the first window by using the first valve, it is possible to selectively adjust an amount of humidification of the inflow gas.

In one form, the first valve may include: a first valve body configured to be movable from a first position at which the first window is closed to a second position at which the first window is opened; and a first valve blade formed on the first valve body and configured to move the first valve body based on the flow rate of the moist air.

In particular, the moist air may be supplied into the housing in a first direction, and the first valve body may selectively open or close the first window while rectilinearly moving in a second direction that intersects the first direction.

The first valve blade may have various structures capable of moving the first valve body when a pressing force is applied by the flow rate of the moist air. For example, the first valve blade may be inclined with respect to the first direction, and the first valve body may be moved in the second direction when the pressing force is applied to the first valve blade by the moist air.

According to the exemplary forms of the present disclosure, the humidifier for a fuel cell may include a guide protrusion formed on the cartridge casing in the movement direction of the first valve body, and a guide groove formed in the first valve body and configured to receive the guide protrusion so that the first valve body is movable.

As described above, the first valve body rectilinearly moves relative to the cartridge casing in the state in which the guide protrusion is received in the guide groove, such that the first valve body is inhibited or prevented from being rotated relative to the cartridge casing. As a result, it is possible to obtain an advantageous effect of stably maintaining a posture and an arrangement state (an arrangement angle) of the first valve blade with respect to the direction in which the moist air is supplied through the moist air supply port.

According to the exemplary forms of the present disclosure, the humidifier for a fuel cell may include a first partition wall configured to divide an internal space of the housing into a first space communicating with the moist air supply port and a second space communicating with the moist air discharge port, and a first through hole formed in the first partition wall, and the first valve body may selectively open or close the first through hole.

According to the exemplary forms of the present disclosure, the humidifier for a fuel cell may include a first elastic member configured to elastically support the movement of the first valve body relative to the cartridge casing.

As described above, since the first valve body is elastically supported by the first elastic member, the first valve body may be automatically returned back to an initial position (e.g., the position at which the first window is closed) by elastic force of the first elastic member when the pressing force applied to the first valve blade is eliminated (e.g., when the supply of the moist air is shut off).

The point in time at which the first window is opened or closed by the first valve and the degree to which the first window is opened or closed by the first valve may be variously changed based on required conditions and design specifications.

For example, the first valve body may close the first window when the flow rate of the moist air is within a first flow rate range, and the first valve body may open at least a part of the first window when the flow rate of the moist air is within a second flow rate range higher than the first flow rate range.

In addition, when the flow rate of the moist air is within the first flow rate range, the first through hole may be opened in a state in which the first window is closed, and when the flow rate of the moist air is within a third flow rate range higher than the second flow rate range, the first valve body may close the first through hole in a state in which the first window is opened.

According to the exemplary forms of the present disclosure, the humidifier for a fuel cell may include an inlet hole formed in the first valve body, and the inlet hole may be disposed to communicate with the first window when the first valve body is positioned at the first position.

This is to reduce or minimize a deterioration in power generation performance (so called, dry out) of the fuel cell stack caused by a decrease in humidity of an electrolyte membrane when an immediate increase in output is required immediately after the cold start of the fuel cell stack in a state in which the first valve is frozen at the first position in the winter season (i.e., a state in which the first valve positioned at the first position is frozen and attached to the cartridge casing).

In contrast, according to the exemplary forms of the present disclosure, the inlet hole is formed in the first valve body, and the inlet hole communicates with the first window in the state in which the first valve body is positioned at the first position, such that even though the first valve is frozen at the first position, the moist air may be supplied to the fuel cell stack by using inflow gas introduced into the cartridge casing through the inlet hole and the first window. As a result, it is possible to obtain an advantageous effect of providing immediate power generation performance immediately after the cold start of the fuel cell stack.

According to another exemplary form of the present disclosure, the humidification unit may include a humidification membrane provided in the housing and configured to allow the inflow gas to flow along the humidification membrane, and the humidification amount adjusting unit may include: a pipe member provided in the housing so as to communicate with the moist air supply port and having, on a first side thereof, a first supply hole that communicates with an internal space of the housing; and a second valve configured to selectively open or close the first supply hole based on the flow rate of the moist air.

The second valve may have various structures capable of opening or closing the first supply hole based on the flow rate of the moist air supplied to the moist air supply port.

For example, the second valve may include: a second valve body provided to be movable from a third position at which the first supply hole is closed to a fourth position at which the first supply hole is opened; and a second valve blade formed on the second valve body and configured to move the second valve body based on the flow rate of the moist air.

In particular, the second valve body may selectively open or close the first supply hole while rectilinearly moving in the direction in which the moist air is supplied into the pipe member.

According to another exemplary form of the present disclosure, the humidifier for a fuel cell may include: a guide hole formed in the second valve and configured to communicate with the moist air supply port; a second supply hole formed on a second side of the pipe member; and a second partition wall disposed between the first supply hole and the second supply hole so as to divide an internal space of the pipe member and have a second through hole, and the second through hole may be selectively opened or closed by the second valve body.

According to another exemplary form of the present disclosure, the humidifier for a fuel cell may include a second elastic member configured to elastically support the movement of the second valve body relative to the pipe member.

As described above, since the second valve body is elastically supported by the second elastic member, the second valve body may be automatically returned back to an initial position (e.g., the position at which the first supply hole is closed) by elastic force of the second elastic member when the pressing force applied to the second valve blade is eliminated (e.g., when the supply of the moist air is shut off).

The point in time at which the first supply hole is opened or closed by the second valve and the degree to which the first supply hole is opened or closed by the second valve may be variously changed based on required conditions and design specifications.

For example, the second valve body may close the first supply hole when the flow rate of the moist air is within a first flow rate range, and the second valve body may open at least a part of the first supply hole when the flow rate of the moist air is within a second flow rate range higher than the first flow rate range.

In addition, when the flow rate of the moist air is within the first flow rate range, the second through hole may be opened in a state in which the first supply hole is closed, and when the flow rate of the moist air is within a third flow rate range higher than the second flow rate range, the second valve body may close the second through hole in a state in which the first supply hole is opened.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
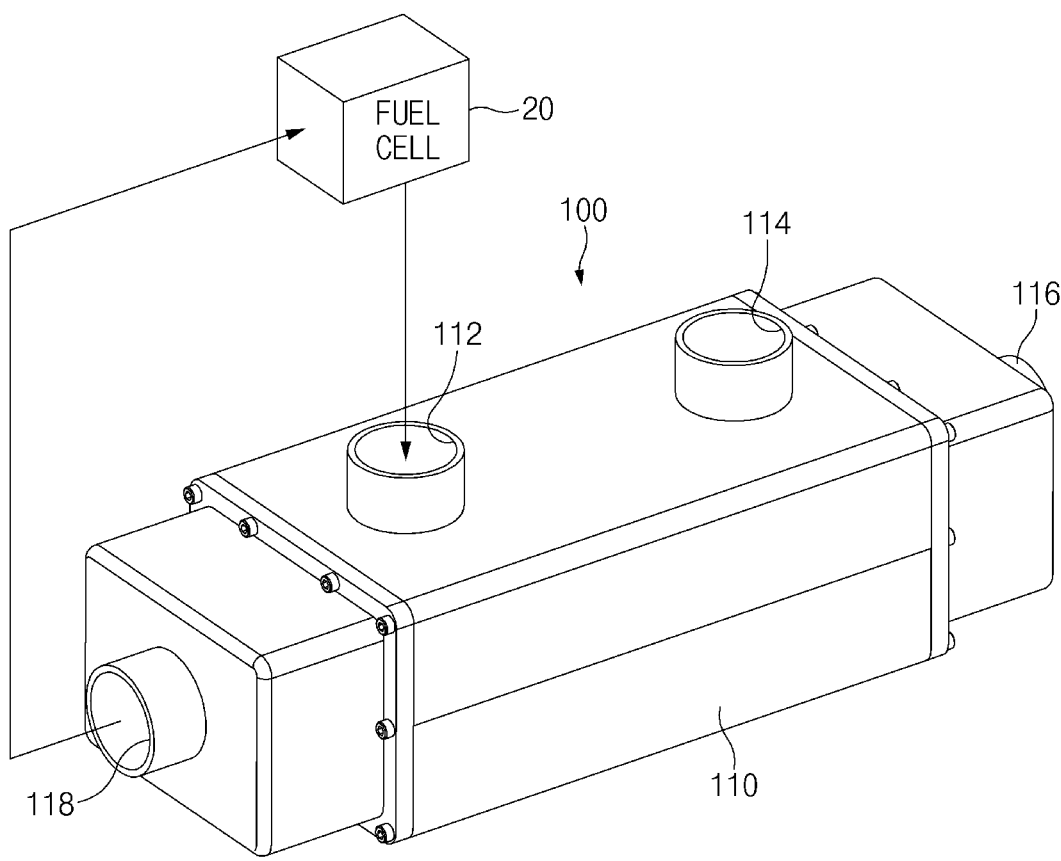
FIG. 1 is a perspective view for explaining a humidifier for a fuel cell according to an exemplary form of the present disclosure.
Figure 2:
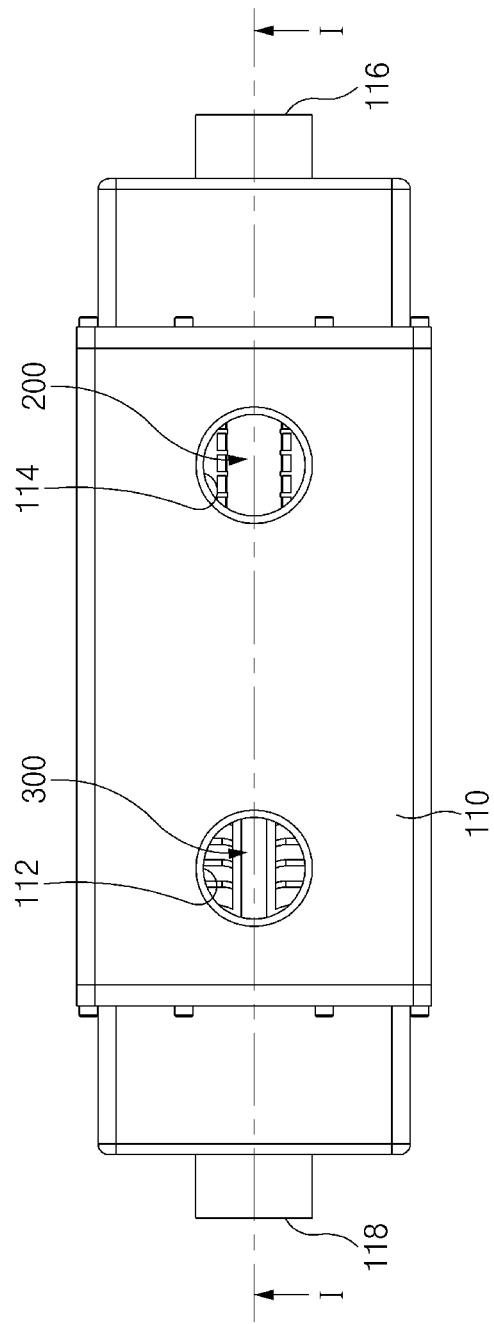
FIG. 2 is a top plan view for explaining the humidifier for a fuel cell in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

However, the technical spirit of the present disclosure is not limited to some exemplary forms described herein but may be implemented in various different forms. One or more of the constituent elements in the exemplary forms may be selectively combined and substituted within the scope of the technical spirit of the present disclosure.

In addition, unless otherwise specifically and explicitly defined and stated, the terms (including technical and scientific terms) used in the exemplary forms of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary form of the present disclosure are for explaining the exemplary forms, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary forms of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 7, a humidifier 100 for a fuel cell according to some forms of the present disclosure includes: a housing 110 having a moist air supply port 112 through which moist air WG is supplied, a moist air discharge port 114 through which the moist air WG is discharged, and an inflow gas supply port 116 through which inflow gas DG is supplied; a humidification unit 200 provided in the housing 110 and configured to humidify the inflow gas DG by using the moist air WG; and a humidification amount adjusting unit 300 configured to selectively adjust an amount of humidification of the inflow gas DG by the humidification unit 200 based on a flow rate of the moist air WG supplied to the moist air supply port 112.

The humidifier 100 according to the present disclosure is provided to humidify the inflow gas DG (e.g., air) to be introduced into a fuel cell stack 20 (e.g., a fuel cell stack mounted in a fuel cell vehicle).

For reference, the fuel cell stack 20 may have various structures capable of producing electricity by means of an oxidation-reduction reaction between fuel (e.g., hydrogen) and an oxidant (e.g., air).

For example, the fuel cell stack 20 may include: a membrane electrode assembly (MEA) (not illustrated) having catalyst electrode layers, in which electrochemical reactions occur, at both sides of an electrolyte membrane through which hydrogen ions move; a gas diffusion layer (GDL) (not illustrated) configured to uniformly distribute reactant gases and serve to transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell stack 20, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane which is a positive ion exchange membrane, and at the same time, the electrons are delivered to the cathode through the gas diffusion layer and the separator which are conductors.

At the cathode, the hydrogen ions supplied through the electrolyte membrane and the electrons delivered through the separator meet oxygen in the air supplied to the cathode by an air supply device to create a reaction of producing water. Due to the movement of the hydrogen ions, the electrons flow through external conductive wires, and an electric current is produced due to the flow of the electrons.

The housing 110 is provided to have a predetermined receiving space therein.

The housing 110 may be variously changed in shape and structure based on required conditions and design specifications, and the present disclosure is not restricted or limited by the shape and the structure of the housing 110. As an example, the housing 110 may be formed in the form of a quadrangular box having therein a receiving space.

The inflow gas supply port 116 through which the inflow gas DG is supplied is formed on a first side of the housing 110, and an inflow gas discharge port 118 through which the inflow gas DG is discharged is formed on a second side of the housing 110.

Figure 3:
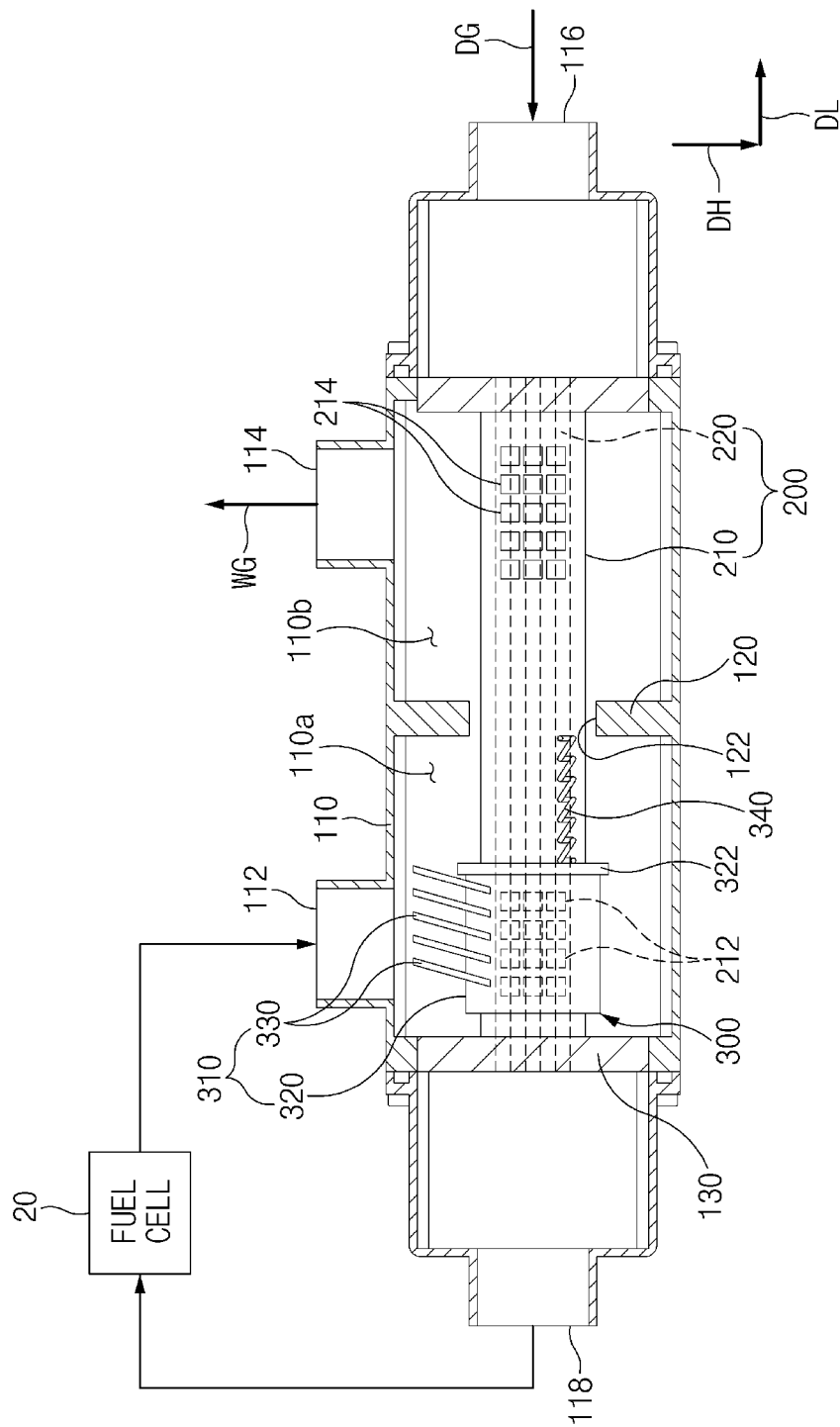
FIG. 3 is a cross-sectional view taken along line 'I-I' in FIG. 2.

For example, based on FIG. 3, the inflow gas supply port 116 through which the inflow gas DG is supplied is formed at a right end of the housing 110, and the inflow gas discharge port 118 is formed at a left end of the housing 110.

In addition, the moist air supply port 112 through which the moist air WG (or produced water) is supplied from the fuel cell stack 20 is formed at a left upper end (based on FIG. 3) of the housing 110, and the moist air discharge port 114 through which the moist air WG is discharged is formed at a right upper end of the housing 110.

For reference, the moist air WG (or produced water) discharged from the fuel cell stack 20 may be introduced into the housing 110 along a connection line (not illustrated) that connects the fuel cell stack 20 and the moist air supply port 112 of the housing 110.

In addition, the inflow gas DG supplied to the inflow gas supply port 116 may be humidified by the moist air WG while passing through the humidification unit 200 provided in the housing 110, and the humidified air (humidified inflow gas) discharged through the inflow gas discharge port 118 may be supplied to the fuel cell stack 20.

The humidification unit 200 is provided in the housing 110 to humidify the inflow gas DG by using the moist air WG supplied into the housing 110.

The humidification unit 200 may have various structures capable of humidifying the inflow gas DG by using the moist air WG, and the present disclosure is not restricted or limited by the structure of the humidification unit 200.

For example, the humidification unit 200 may include: a cartridge casing 210 provided in the housing 110, having, on a first side thereof, first windows 212 through which the moist air WG is introduced, and having, on a second side thereof, second windows 214 through which the moist air WG is discharged; and humidification membranes 220 provided in the cartridge casing 210 and configured to allow the inflow gas DG to flow along the humidification membranes 220.

The cartridge casing 210 may have various structures having therein a receiving space, and the present disclosure is not restricted or limited by the structure of the cartridge casing 210.

For reference, the number of cartridge casings 210 and the arrangement of the cartridge casings 210 may be variously changed based on required conditions and design specifications. For example, two cartridge casings 210 may be arranged to be spaced apart from each other in the housing 110. According to another exemplary form of the present disclosure, only the single cartridge casing may be disposed in the housing, or three or more cartridge casings may be disposed in the housing.

More specifically, the first windows 212 through which the moist air WG is introduced are formed on a first side of the cartridge casing 210 (at a left end of the cartridge casing based on FIG. 3), and the second windows 214 through which the moist air WG is discharged are formed on a second side of the cartridge casing 210 (at a right end of the cartridge casing based on FIG. 3).

The number of first and second windows 212 and 214 and the structures of the first and second windows 212 and 214 may be variously changed based on required conditions and design specifications, and the present disclosure is not restricted or limited by the number of first and second windows 212 and 214 and the structures of the first and second windows 212 and 214. For example, the plurality of first windows 212 and the plurality of second windows 214 may be formed in the cartridge casing 210 and each may be formed in the form of an approximately quadrangular hole.

According to another exemplary form of the present disclosure, the first and second windows each may be formed in the form of a circular hole or may be formed in other shapes. Alternatively, the single first window and the single second window may be formed in the cartridge casing.

The humidification membranes 220 are provided in the cartridge casing 210 and configured such that the inflow gas DG flows along the inside of the humidification membranes 220.

For example, the humidification membrane 220 is formed as a tubular hollow fiber membrane in which the inflow gas DG may flow, and one end (inlet end) and the other end (outlet end) of the humidification membrane 220 are fixed in the cartridge casing 210 by a potting material 130.

For reference, since the humidification membrane 220 is formed as a hollow fiber membrane, the moisture (e.g., the moisture in the moist air) supplied into the cartridge casing 210 may penetrate into the humidification membrane 220 from the outside of the humidification membrane 220 and then be transferred to the inflow gas DG. However, the inflow gas DG cannot penetrate the humidification membrane 220 from the inside of the humidification membrane 220 to the outside of the humidification membrane 220.

With the above-mentioned configuration, the moist air WG, which is supplied into the housing 110 through the moist air supply port 112, may be supplied into the cartridge casing 210 through the first windows 212, and the moist air WG supplied into the cartridge casing 210 may flow around the humidification membrane 220 and humidify the inflow gas DG flowing along the humidification membrane 220. Thereafter, the moist air WG, which is discharged to the outside of the cartridge casing 210 through the second windows 214, may be discharged to the outside of the housing 110 through the moist air discharge port 114.

The humidification amount adjusting unit 300 is provided to selectively adjust an amount of humidification (a degree of humidification) of the inflow gas DG by the humidification unit 200 based on a flow rate of the moist air WG supplied into the moist air supply port 112.

In this case, the configuration in which the amount of humidification of the inflow gas DG is selectively adjusted based on the flow rate of the moist air WG may means that the amount of humidification of the inflow gas DG by the humidification unit 200 is increased or decreased based on a change in flow rate (e.g., an increase in flow rate or a decrease in flow rate) of the moist air WG supplied to the moist air supply port 112.

The humidification amount adjusting unit 300 may have various structures capable of adjusting the amount of humidification of the inflow gas DG by the humidification unit 200 based on the flow rate of the moist air WG supplied to the moist air supply port 112.

For example, the humidification amount adjusting unit 300 may include a first valve 310 configured to selectively open or close the first windows 212 based on the flow rate of the moist air WG.

The first valve 310 may adjust an amount of humidification of the inflow gas DG by selectively opening or closing the first windows 212 (or adjusting opening degrees of the first windows) based on the flow rate of the moist air WG supplied to the moist air supply port 112.

This configuration is based on the fact that the amount of humidification of the inflow gas DG by the humidification unit 200 varies depending on (in proportion to) the supply amount of the moist air WG supplied into the cartridge casing 210. The amount of humidification of the inflow gas DG may be selectively adjusted because the supply amount of the moist air WG to be supplied to the cartridge casing 210 may be adjusted by selectively opening or closing the first windows 212.

For example, when the supply amount of the moist air WG supplied to the cartridge casing 210 is increased, the amount of humidification of the inflow gas DG may be increased. On the contrary, when the supply amount of the moist air WG supplied to the cartridge casing 210 is decreased, the amount of humidification of the inflow gas DG may be decreased.

The first valve 310 may have various structures capable of selectively opening or closing the first windows 212 based on the flow rate of the moist air WG, and the present disclosure is not restricted or limited by the structure of the first valve 310 and the method of operating the first valve 310.

For example, the first valve 310 may include: a first valve body 320 configured to be movable from a first position at which the first windows 212 are closed to a second position at which the first windows 212 are opened; and first valve blades 330 formed on the first valve body 320 and configured to move the first valve body 320 based on the flow rate of the moist air WG.

Hereinafter, an example in which the first valve body 320 is configured to rectilinearly move from the first position to the second position will be described. According to another exemplary form of the present disclosure, the first valve body may be configured to rotate from the first position to the second position or move along a curved trajectory.

The first valve body 320 may have various structures capable of selectively opening or closing the first windows 212.

For example, the first valve body 320 may have a hollow cylindrical structure that surrounds the cartridge casing 210. The first windows 212 may be closed in a state in which the first valve body 320 covers the first windows 212 (at the first position), and the first windows 212 may be opened in a state in which the first valve body 320 is disposed to be spaced apart from the first windows 212 (at the second position).

For reference, in the exemplary form of the present disclosure, the configuration in which the first valve body 320 has a ring-shaped structure (i.e., the hollow cylindrical structure) continuously surrounding an outer surface of the cartridge casing 210 is described as an example. However, according to another exemplary form of the present disclosure, the first valve body may partially cover the outer surface of the cartridge casing.

In particular, the moist air WG may be supplied into the housing 110 in a first direction DH (e.g., a vertical direction based on FIG. 3), and the first valve body 320 may selectively open or close the first windows 212 while rectilinearly moving in a second direction DL (e.g., a horizontal direction based on FIG. 3) that intersects the first direction.

The first valve blades 330 are formed on the first valve body 320 and configured to move the first valve body 320 based on the flow rate of the moist air WG.

In this case, the configuration in which the first valve blades 330 move the first valve body 320 based on the flow rate of the moist air WG means that the first valve body 320 is moved in the second direction when pressing force with a predetermined magnitude or higher is applied to (exerted on) the first valve blades 330 by the flow rate of the moist air WG.

The first valve blade may have various structures capable of moving the first valve body 320 when the pressing force is applied to the first valve blade 330 by the flow rate of the moist air WG, and the present disclosure is not restricted or limited by the structure of the first valve blade 330.

For example, the first valve blade 330 is inclined with respect to the first direction DH, and the first valve body 320 may be moved in the second direction when the pressing force is applied to the first valve blade 330 by the moist air WG.

Figure 4:
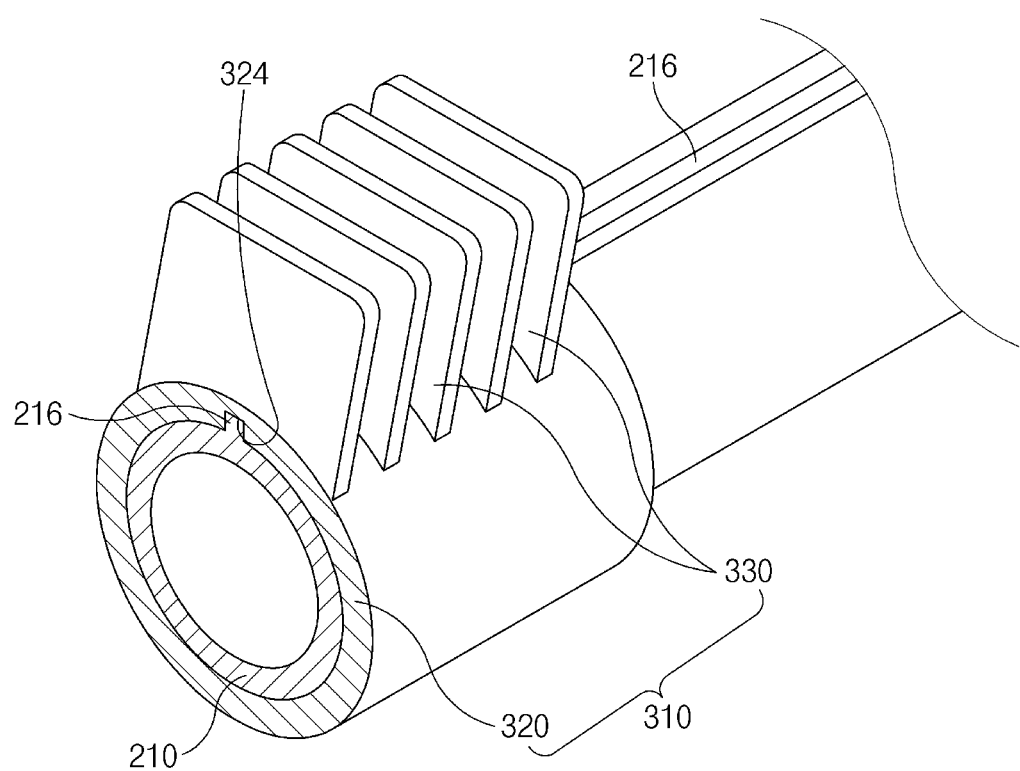
FIG. 4 is a view for explaining a guide protrusion and a guide groove in the humidifier for a fuel cell in one form of the present disclosure.

Referring to FIG. 4, according to one exemplary form of the present disclosure, the humidifier 100 for a fuel cell may include a guide protrusion 216 formed on the cartridge casing 210 in the movement direction of the first valve body 320, and a guide groove 324 formed in the first valve body 320 and configured to receive the guide protrusion 216 so that the first valve body 320 is movable.

For example, the guide protrusion 216 may be formed on an upper portion of the cartridge casing 210 in a longitudinal direction (e.g., in the horizontal direction), and the guide groove 324 may be formed in an inner surface of the first valve body 320 and may receive the guide protrusion 216 so that the first valve body 320 is rectilinearly movable.

As described above, the first valve body 320 rectilinearly moves relative to the cartridge casing 210 in the state in which the guide protrusion 216 is received in the guide groove 324, such that the first valve body 320 is prevented from being rotated relative to the cartridge casing 210. As a result, it is possible to obtain an advantageous effect of stably maintaining a posture and an arrangement state (an arrangement angle) of the first valve blade 330 with respect to the direction (the first direction) in which the moist air WG is supplied through the moist air supply port 112.

In the exemplary form of the present disclosure described above and illustrated in the drawings, the configuration in which the guide protrusion 216 is formed on the cartridge casing 210 and the guide groove 324 is formed in the first valve body 320 is described as an example. However, according to another exemplary form of the present disclosure, the guide protrusion may be formed on the first valve body, and the guide groove may be formed in the cartridge casing.

According to the exemplary form of the present disclosure, the humidifier 100 for a fuel cell may include a first partition wall 120 configured to divide an internal space of the housing 110 into a first space 110a communicating with the moist air supply port 112 and a second space 110b communicating with the moist air discharge port 114, and a first through hole 122 formed in the first partition wall 120.

The first partition wall 120 is provided to divide the internal space of the housing 110 into the first space 110a and the second space 110b. The first space 110a communicates with the moist air supply port 112 and the first windows 212, and the second space 110b communicates with the moist air discharge port 114 and the second windows 214.

The first through hole 122 may have various structures capable of allowing the first space 110a and the second space 110b to communicate with each other. For example, the first through hole 122 may be formed to have a larger diameter than the cartridge casing 210, and the cartridge casing 210 may be disposed to pass through the first through hole 122.

Further, the first through hole 122 may be selectively opened or closed by the first valve body 320.

For example, a flange portion 322 having an expanded diameter may be formed at an end of the first valve body 320 adjacent to the first partition wall 120. The first through hole 122 may be closed in a state in which the flange portion 322 is in close contact with the first partition wall 120 (e.g., in a state in which the first windows 212 are entirely opened). The first through hole 122 may be opened in a state in which the flange portion 322 is spaced apart from the first partition wall 120 (e.g., in a state in which the first windows 212 are closed or partially opened).

According to the exemplary form of the present disclosure, the humidifier 100 for a fuel cell may include a first elastic member 340 configured to elastically support the movement of the first valve body 320 relative to the cartridge casing 210.

Various elastic members capable of elastically supporting the movement of the first valve body 320 relative to the cartridge casing 210 may be used as the first elastic member 340, and the present disclosure is not restricted or limited by the type and the structure of the first elastic member 340.

For example, a typical spring may be used as the first elastic member 340, and the first elastic member 340 may be disposed between the first partition wall 120 and the first valve body 320 so as to be elastically compressible and restorable.

According to another exemplary form of the present disclosure, one end of the first elastic member may be connected to the first valve body, and the other end of the first elastic member may be connected to the cartridge casing. Alternatively, one end of the first elastic member may be connected to the first valve body, and the other end of the first elastic member may be connected to the first partition wall.

As described above, since the first valve body 320 is elastically supported by the first elastic member 340, the first valve body 320 may be automatically returned back to an initial position (e.g., the position at which the first windows are closed) by elastic force of the first elastic member 340 when the pressing force applied to the first valve blade 330 is eliminated (e.g., when the supply of the moist air is shut off).

The point in time at which the first windows 212 are opened or closed by the first valve 310 and the degree to which the first windows 212 are opened or closed by the first valve 310 may be variously changed based on required conditions and design specifications, and the present disclosure is not restricted or limited by the point in time at which the first windows 212 are opened or closed by the first valve 310 and the degree to which the first windows 212 are opened or closed by the first valve 310.

Figure 5:
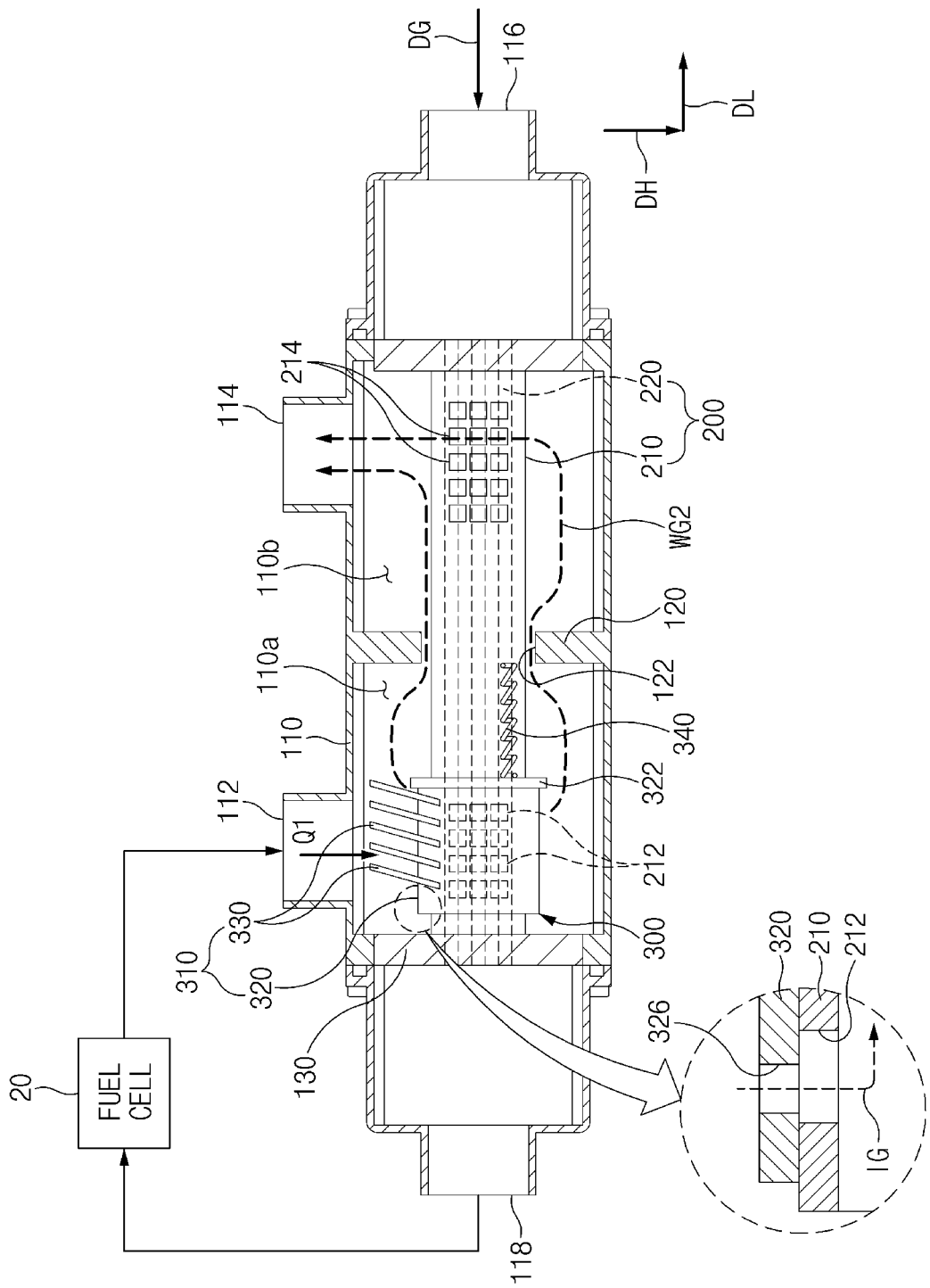
FIG. 5 is a view for explaining a flow of moist air in a state in which a flow rate of the moist air is within a first flow rate range in the humidifier for a fuel cell according to one exemplary form of the present disclosure.

For example, referring to FIG. 5, in a first operating condition (e.g., a low-output operating condition) of the fuel cell stack 20, the moist air WG generated in the fuel cell stack 20 may be supplied into the housing 110 with a first flow rate range Q1. When the flow rate of the moist air WG supplied into the housing 110 is within the first flow rate range Q1, the first valve body 320 may close the first windows 212.

In addition, the first through hole 122 may be opened in the state in which the flow rate of the moist air WG supplied into the housing 110 is within the first flow rate range Q1 and the first valve body 320 closes the first windows 212. Therefore, the moist air WG2 supplied to the first space 110a may be introduced into the second space 110b through the first through hole 122 and then discharged to the outside of the housing 110 through the moist air discharge port 114.

As described above, since the flow rate (the first flow rate range) of the moist air WG supplied to the housing 110 is low in the first operating condition (e.g., the low-output operating condition) of the fuel cell stack 20, that is, since the pressing force applied to the first valve blades 330 is lower than the elastic force of the first elastic member 340, the first windows 212 are closed by the first valve body 320, such that the amount of humidification of the inflow gas DG may be decreased or the humidification may be stopped.

For reference, the amount of humidification of the inflow gas DG, which is produced when the moist air WG2 introduced into the second space 110b through the first through hole 122 is introduced into the cartridge casing 210 through the second windows 214, is very small and thus may be ignored.

Figure 6:
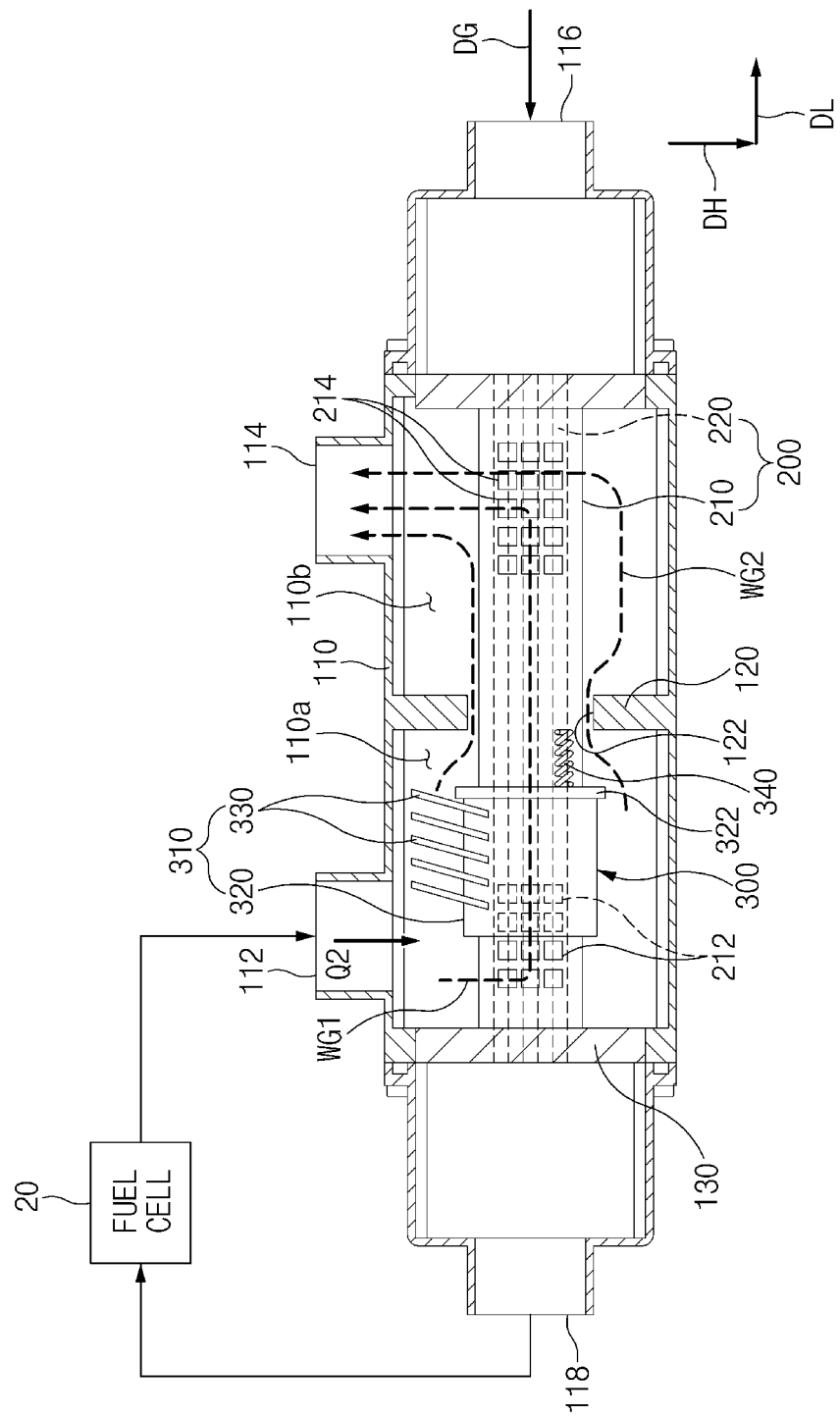
FIG. 6 is a view for explaining a flow of the moist air in a state in which a flow rate of the moist air is within a second flow rate range in the humidifier for a fuel cell according to another exemplary form of the present disclosure.

As another example, referring to FIG. 6, in a second operating condition (e.g., a medium-output operating condition) of the fuel cell stack 20, the moist air WG generated in the fuel cell stack 20 may be supplied into the housing 110 with a second flow rate range Q2 higher than the first flow rate range Q1. When the flow rate of the moist air WG supplied into the housing 110 is within the second flow rate range Q2, the first valve body 320 is moved in the second direction, such that the first windows 212 may be partially opened (e.g., some of the plurality of first windows may be opened).

As described above, in the second operating condition (e.g., the medium-output operating condition) of the fuel cell stack 20, the pressing force applied to the first valve blades 330 is higher than the elastic force of the first elastic member 340 because of the flow rate (the second flow rate range) of the moist air WG supplied to the housing 110, such that the first windows 212 may be partially opened, and the amount of humidification of the inflow gas DG may be increased.

In addition, the first through hole 122 may remain in the opened state in the state in which the flow rate of the moist air WG supplied into the housing 110 is within the second flow rate range Q2 and the first valve body 320 partially open the first windows 212 (the state in which the flange portion is spaced apart from the first partition wall). Therefore, a part WG1 of the moist air WG supplied to the first space 110a may be introduced into the cartridge casing 210 through the first windows 212, and the remaining part WG2 of the moist air WG supplied to the first space 110a may be introduced into the second space 110b through the first through hole 122 and then discharged to the outside of the housing 110 through the moist air discharge port 114.

Figure 7:
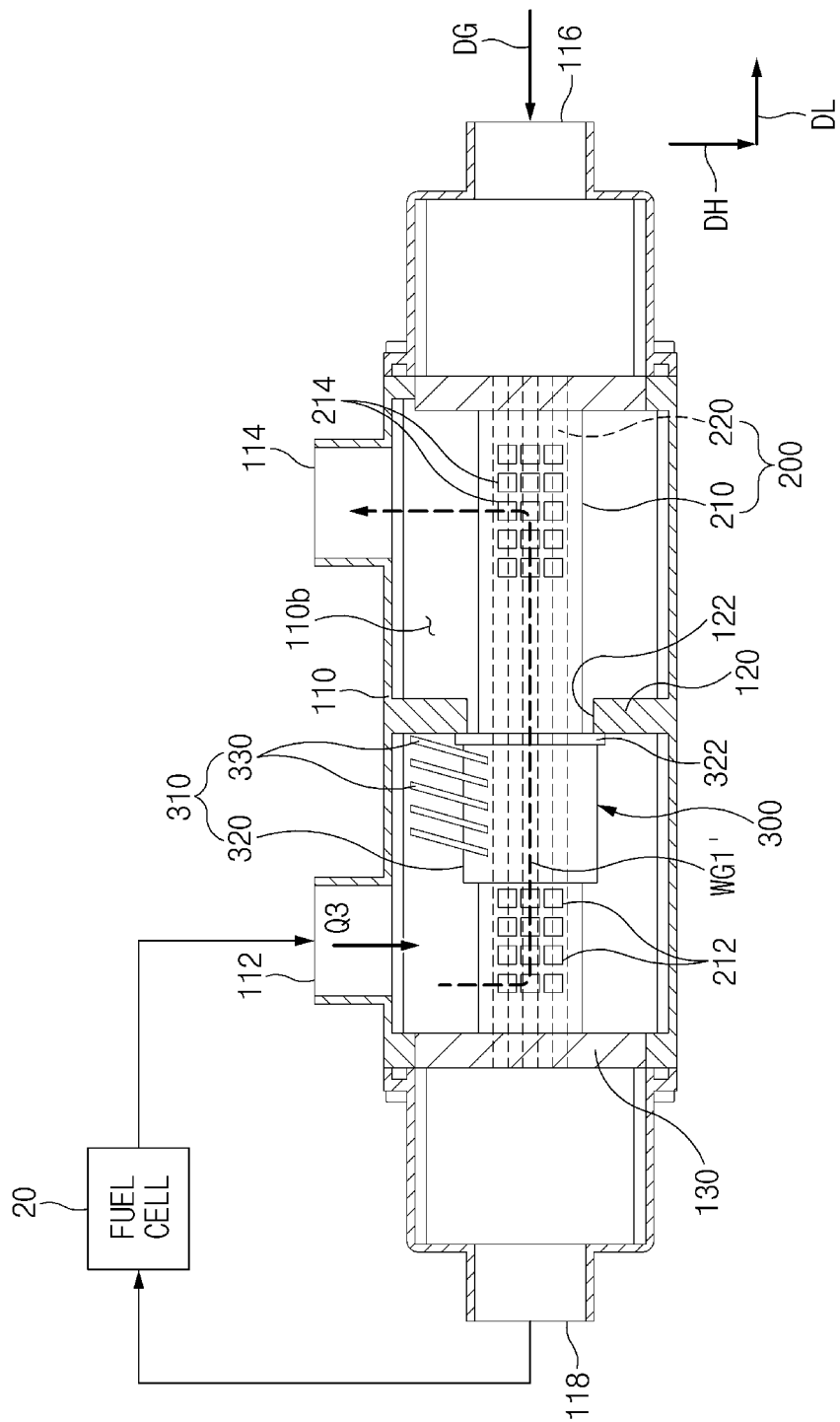
FIG. 7 is a view for explaining a flow of the moist air in a state in which a flow rate of the moist air is within a third flow rate range in the humidifier for a fuel cell in one form of the present disclosure.

As still another example, referring to FIG. 7, in a third operating condition (e.g., a high-output operating condition) of the fuel cell stack 20, the moist air WG generated in the fuel cell stack 20 may be supplied into the housing 110 with a third flow rate range Q3 higher than the second flow rate range Q2. When the flow rate of the moist air WG supplied into the housing 110 is within the third flow rate range Q3, the first valve body 320 is moved in the second direction until the first valve body 320 comes into close contact with the first partition wall 120, such that the first windows 212 are entirely opened (e.g., all of the plurality of first windows may be opened).

As described above, in the third operating condition (e.g., the high-output operating condition) of the fuel cell stack 20, the pressing force applied to the first valve blades 330 is higher than the elastic force of the first elastic member 340 because of the flow rate (the third flow rate range) of the moist air WG supplied to the housing 110, such that the first windows 212 may be entirely opened, and the amount of humidification of the inflow gas DG may be further increased.

In addition, the first through hole 122 may be closed in the state in which the flow rate of the moist air WG supplied to the housing 110 is within the third flow rate range Q3 and the first valve body 320 open the entire first windows 212 (the state in which the flange portion 322 is in close contact with the first partition wall 120). Therefore, the entire moist air WG1' supplied to the first space 110a may be introduced into the cartridge casing 210 through the first windows 212.

Meanwhile, when the operation of the fuel cell stack 20 is stopped, no moist air WG is supplied to the housing 110, such that the first valve body 320 may be automatically returned back to the initial position (e.g., the position at which the first windows are closed) by the elastic force of the first elastic member 340 (see FIG. 3).

As described above, according to the exemplary form of the present disclosure, the supply amount of the moist air WG to be introduced into the cartridge casing 210 may be adjusted by opening or closing the first windows 212 based on the flow rate of the moist air WG supplied to the moist air supply port 112 of the housing 110, such that it is possible to obtain an advantageous effect of accurately adjusting the amount of humidification of the inflow gas DG, which is to be supplied to the fuel cell stack 20, based on the operating condition of the fuel cell stack 20.

This configuration is based on the fact that the amount of humidification of the inflow gas DG by the humidification unit 200 varies depending on (in proportion to) the supply amount of the moist air WG supplied into the cartridge casing 210. The supply amount of the moist air WG to be supplied to the cartridge casing 210 may be adjusted by selectively opening or closing the first windows 212, such that it is possible to obtain an advantageous effect of accurately controlling the amount of humidification of the inflow gas DG based on the operating condition of the fuel cell stack 20.

Above all, since the first valve 310 configured to open or close the first windows 212 actively operates based on the flow rate of the moist air WG, it is possible to obtain an advantageous effect of simplifying the structure and the operational structure, more accurately adjusting the amount of humidification of the inflow gas DG, which is to be supplied to the fuel cell stack 20, based on the operating condition of the fuel cell stack 20, and improving humidification performance.

In addition, referring to FIG. 5, the humidifier 100 for a fuel cell according to the exemplary form of the present disclosure may include an inlet hole 326 formed in the first valve body 320, and the inlet hole 326 may be disposed to communicate with the first window 212 when the first valve body 320 is positioned at the first position.

This is to reduce or minimize a deterioration in power generation performance (so called, dry out) of the fuel cell stack 20 caused by a decrease in humidity of an electrolyte membrane when an immediate increase in output is required immediately after the cold start of the fuel cell stack 20 in a state in which the first valve 310 is frozen at the first position in the winter season (i.e., a state in which the first valve positioned at the first position is frozen and attached to the cartridge casing).

That is, in the state in which the first valve 310 is frozen at the first position, the first windows 212 are closed by the first valve 310, and it is difficult to supply the moist air (the humidified inflow gas) to the fuel cell stack 20 even when an immediate increase in output is required immediately after the cold start of the fuel cell stack 20, and as a result, there is a problem in that the power generation performance of the fuel cell stack 20 deteriorates.

In contrast, according to the exemplary form of the present disclosure, the inlet hole is formed in the first valve body 320, and the inlet hole 326 communicates with the first window 212 in the state in which the first valve body 320 is positioned at the first position, such that even though the first valve 310 is frozen at the first position, the moist air may be supplied to the fuel cell stack 20 by using inflow gas IG introduced into the cartridge casing 210 through the inlet hole 326 and the first window 212. As a result, it is possible to obtain an advantageous effect of providing immediate power generation performance immediately after the cold start of the fuel cell stack 20.

The inlet hole 326 may have various structures capable of communicating with the first window 212 in the state in which the first valve body 320 is positioned at the first position, and the present disclosure is not restricted or limited by the structure of the inlet hole 326. In addition, the size of the inlet hole 326 and the number of inlet holes 326 may be variously changed based on required conditions and design specifications.

Meanwhile, when a predetermined period of time has elapsed after the fuel cell stack 20 starts, an internal temperature of the humidifier 100 is increased, such that the first valve 310 may come out of the frozen state.

Figure 8:
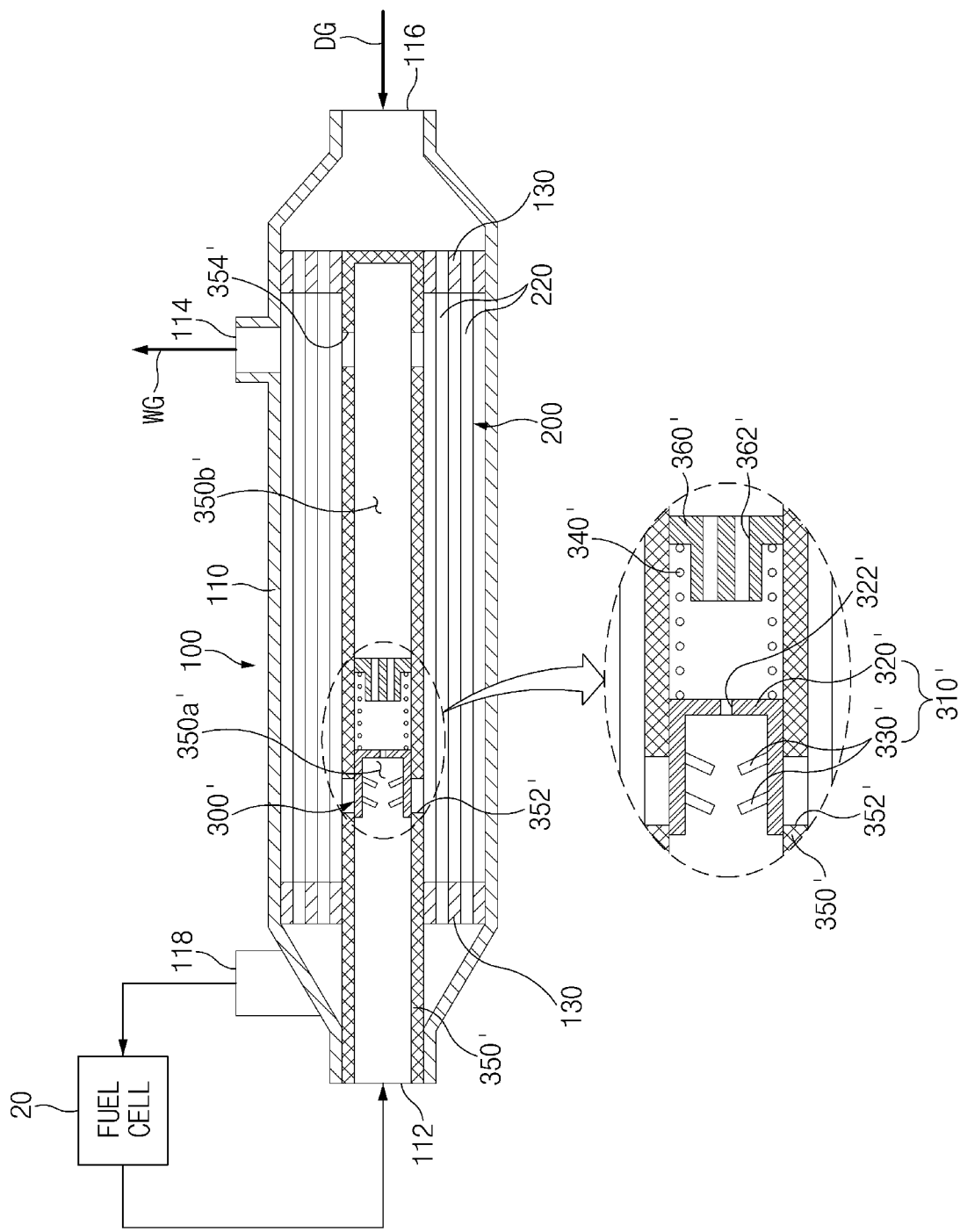
FIG. 8 is a view for explaining a humidifier for a fuel cell according to another exemplary form of the present disclosure.
Figure 9:
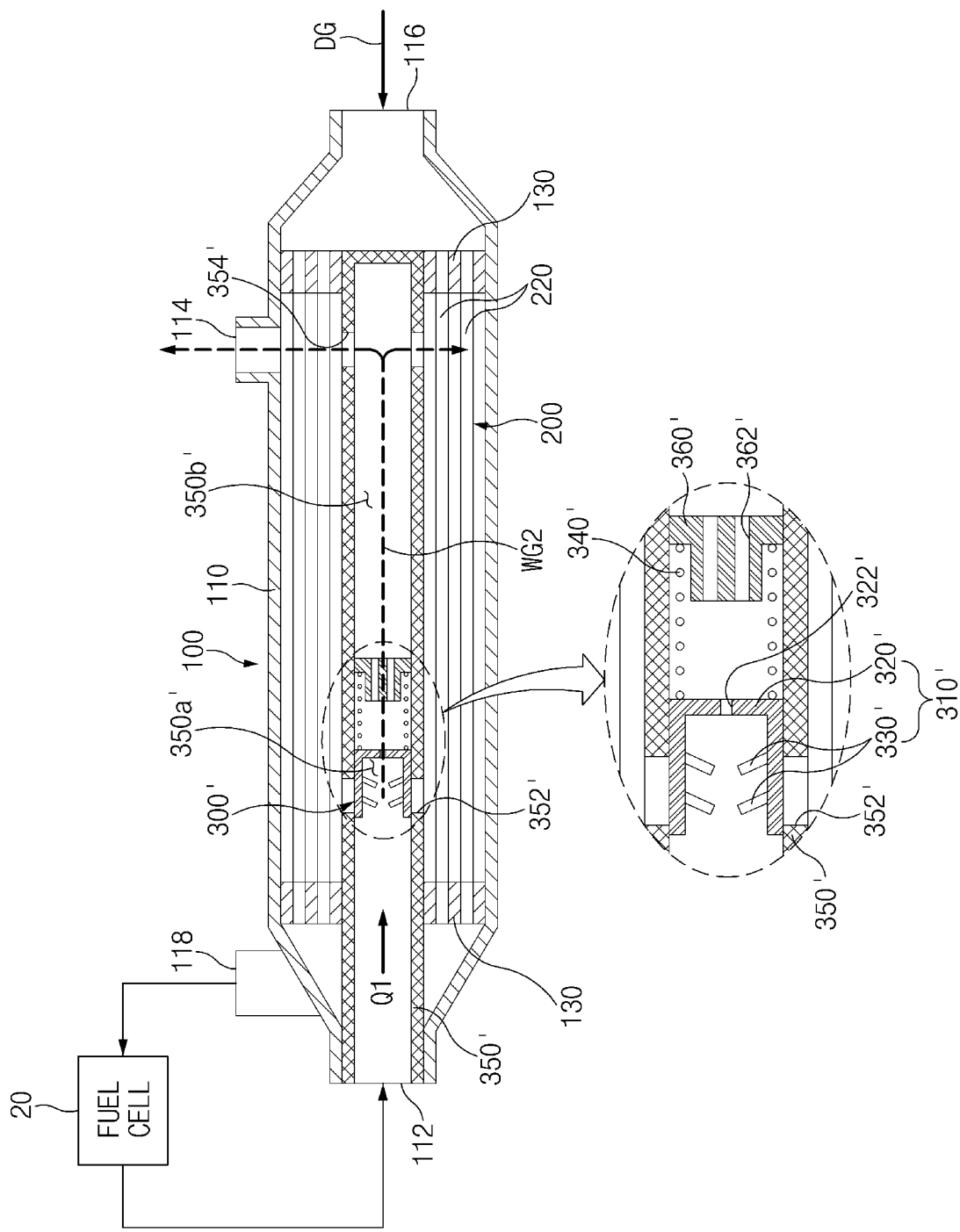
FIGS. 9 to 11 are views respectively explaining flows of the moist air based on flow rates of the moist air in the humidifier for a fuel cell according to some exemplary forms of the present disclosure.
Figure 10:
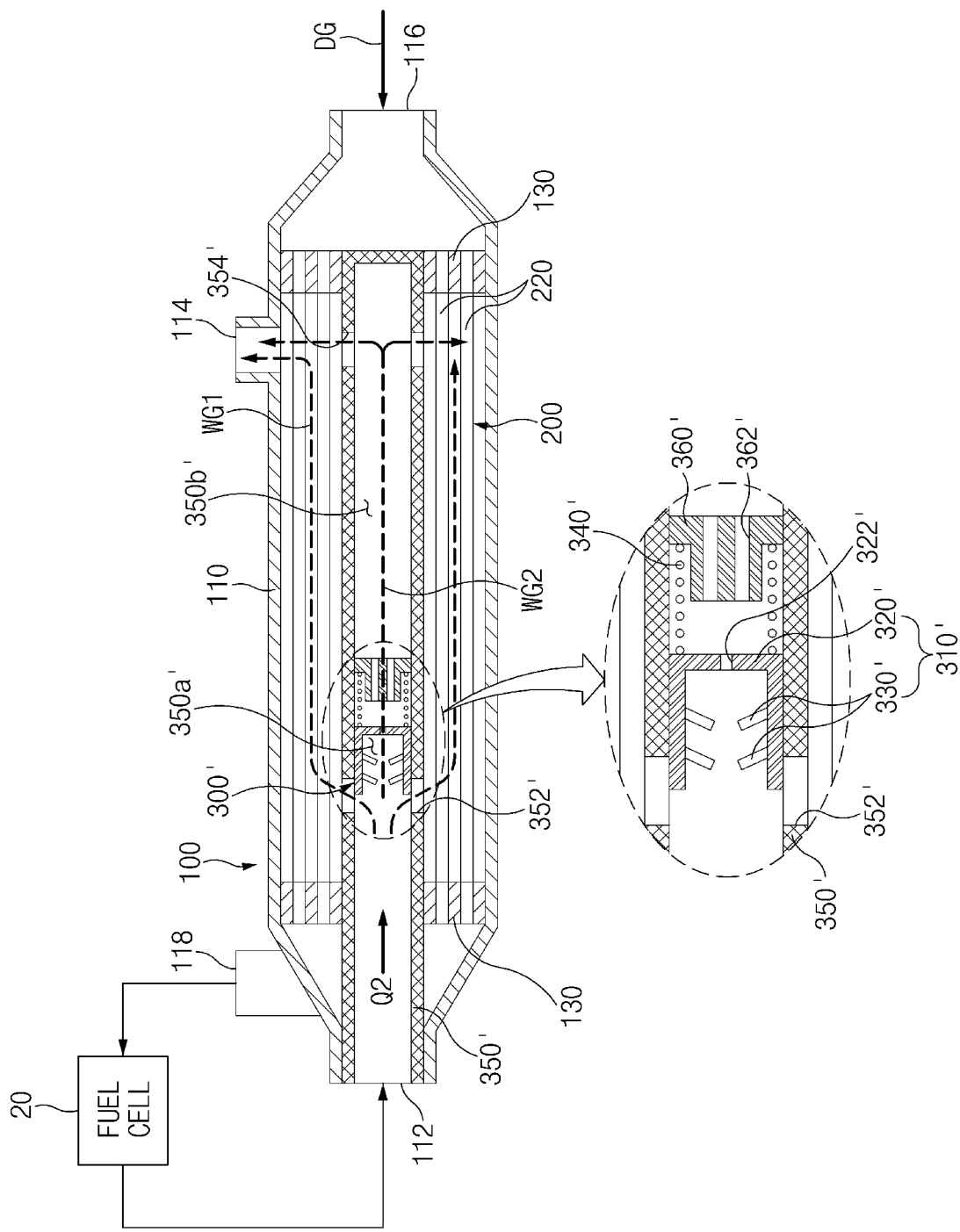
Figure 11:
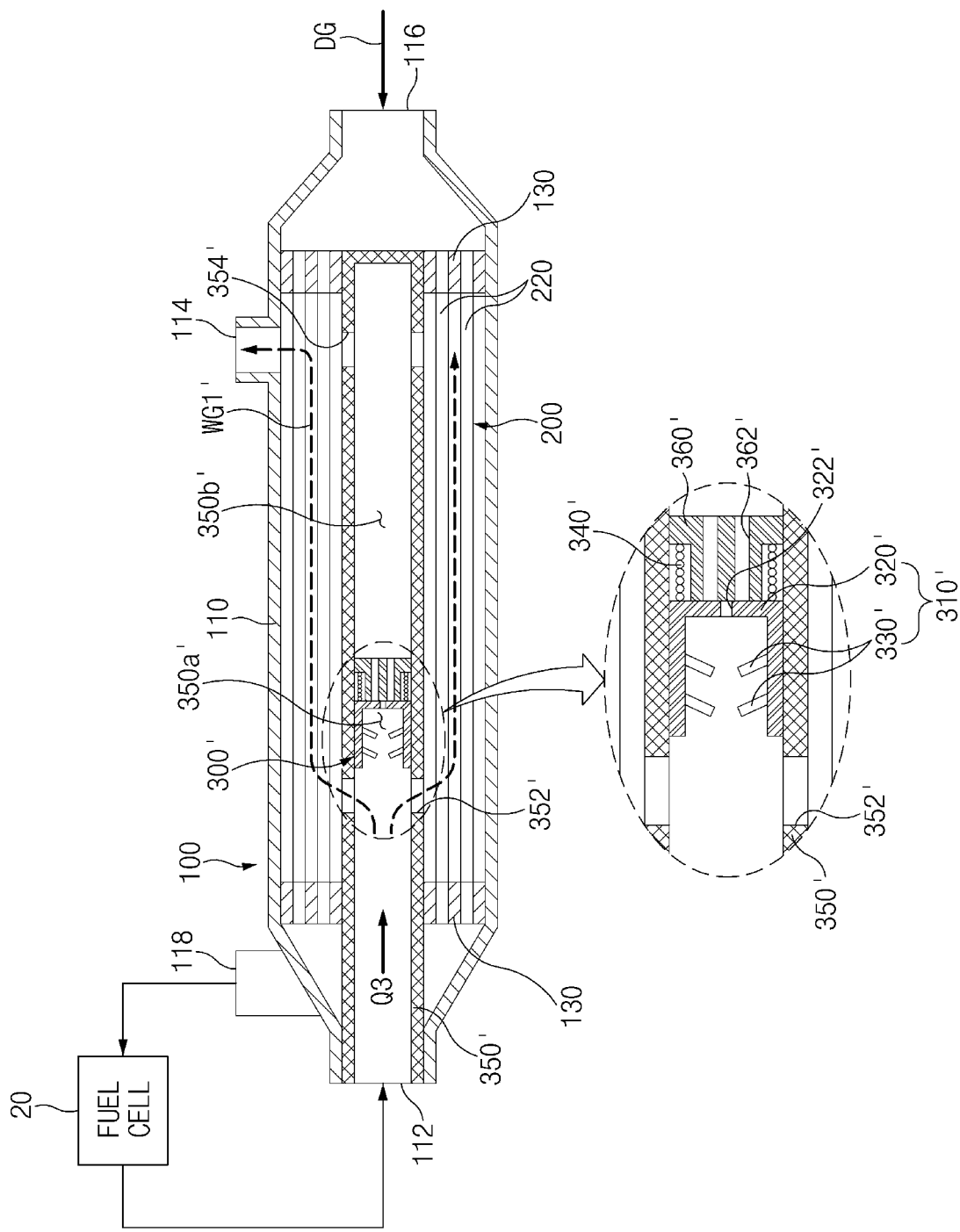

Meanwhile, FIG. 8 is a view for explaining a humidifier for a fuel cell according to another exemplary form of the present disclosure, and FIGS. 9 to 11 are views for explaining flows of the moist air based on flow rates of the moist air in the humidifier for a fuel cell according to another exemplary form of the present disclosure. Further, the parts identical and equivalent to the parts in the above-mentioned configuration will be designated by the identical or equivalent reference numerals, and detailed descriptions thereof will be omitted.

Referring to FIGS. 8 to 11, the humidifier 100 for a fuel cell according to another exemplary form of the present disclosure includes: the housing 110 having the moist air supply port 112 through which the moist air WG is supplied, the moist air discharge port 114 through which the moist air WG is discharged, and the inflow gas supply port 116 through which the inflow gas DG is supplied; the humidification unit 200 provided in the housing 110 and configured to humidify the inflow gas DG by using the moist air WG; and a humidification amount adjusting unit 300' configured to selectively adjust an amount of humidification of the inflow gas DG by the humidification unit 200 based on a flow rate of the moist air WG supplied to the moist air supply port 112, in which the humidification unit 200 may include only the humidification membranes 220 without including the cartridge casing 210 (see FIG. 3).

The humidification amount adjusting unit 300' may have various structures capable of selectively adjusting the amount of humidification (the degree of humidification) of the inflow gas DG by the humidification membrane 220 based on the flow rate of the moist air WG supplied to the moist air supply port 112.

For example, the humidification amount adjusting unit 300' may include: a pipe member 350' provided in the housing 110 so as to communicate with the moist air supply port 112 and having, on a first side thereof, a first supply hole 352' that communicates with an internal space of the housing 110; and a second valve 310' configured to selectively open or close the first supply hole 352' based on the flow rate of the moist air WG.

The pipe member 350' is provided in the housing 110 so as to communicate with the moist air supply port 112.

The pipe member 350' may have various structures having a predetermined space therein, and the present disclosure is not restricted or limited by the structure and the shape of the pipe member 350'.

For example, the pipe member 350' may be formed as a hollow tubular member opened, at one end thereof, to communicate with the moist air supply port 112 and closed at the other end thereof. The pipe member 350' may be fixed in the housing 110 by the potting material 130.

More specifically, the first supply hole 352', through which the moist air WG supplied along the pipe member 350' is supplied to the internal space of the housing 110, is formed on a first side of the pipe member 350'.

According to the exemplary form of the present disclosure, a second supply hole 354', through which the moist air WG supplied along the pipe member 350' is supplied to the internal space of the housing 110, may be formed on a second side of the pipe member 350' so as to be spaced apart from the first supply hole 352'.

The second valve 310' is provided to selectively open or close the first supply hole 352' based on the flow rate of the moist air WG supplied to the moist air supply port 112.

This configuration is based on the fact that the amount of humidification of the inflow gas DG flowing along the humidification membrane 220 varies depending on (in proportion to) the supply amount of the moist air WG supplied into the housing 110 (around the humidification membranes). The amount of humidification of the inflow gas DG may be selectively adjusted because the supply amount of the moist air WG to be supplied into the housing 110 may be adjusted by selectively opening or closing the first supply hole 352'.

For example, when the supply amount of the moist air WG supplied into the housing 110 is increased, the amount of humidification of the inflow gas DG may be increased. On the contrary, when the supply amount of the moist air WG supplied into the housing 110 is decreased, the amount of humidification of the inflow gas DG may be decreased.

The second valve 310' may have various structures capable of opening or closing the first supply hole 352' based on the flow rate of the moist air WG supplied to the moist air supply port 112, and the present disclosure is not restricted or limited by the structure of the second valve 310' and the method of operating the second valve 310'.

For example, the second valve 310' may include: a second valve body 320' provided to be movable from a third position at which the first supply hole 352' is closed to a fourth position at which the first supply hole 352' is opened; and second valve blades 330' formed on the second valve body 320' and configured to move the second valve body 320' based on the flow rate of the moist air WG.

Hereinafter, an example in which the second valve body 320' is configured to rectilinearly move from the third position to the fourth position will be described. According to another exemplary form of the present disclosure, the second valve body may be configured to rotate from the third position to the fourth position or move along a curved trajectory.

The second valve body 320' may have various structures capable of selectively opening or closing the first supply hole 352'.

For example, the second valve body 320' may be formed in the form of a hollow cylindrical structure having a diameter corresponding to an inner diameter of the pipe member 350' and provided in the pipe member 350'. The first supply hole 352' may be closed in a state in which the second valve body 320' is disposed to close the first supply hole 352' (at the third position), and the first supply hole 352' may be opened in a state in which the second valve body 320' is disposed to be spaced apart from the first supply hole 352' (at the fourth position).

In particular, the moist air WG may be supplied into the pipe member 350' in the second direction (e.g., the horizontal direction based on FIG. 8), and the second valve body 320' may selectively open or close the first supply hole 352' while rectilinearly moving in the second direction (e.g., the horizontal direction based on FIG. 8) in which the moist air WG is supplied into the pipe member 350'.

The second valve blades 330' are formed on the second valve body 320' and configured to move the second valve body 320' based on the flow rate of the moist air WG supplied to the pipe member 350'.

In this case, the configuration in which the second valve blades 330' move the second valve body 320' based on the flow rate of the moist air WG means that the second valve body 320' is moved in the second direction when pressing force with a predetermined magnitude or higher is applied to (exerted on) the second valve blades 330' by the flow rate of the moist air WG.

The second valve blade 330' may have various structures capable of moving the second valve body 320' when the pressing force is applied to the second valve blade 330' by the flow rate of the moist air WG, and the present disclosure is not restricted or limited by the structure of the second valve blade 330'.

For example, the second valve blade 330' is disposed (e.g., inclined) in a direction that intersects the second direction, and the second valve body 320' may be moved in the second direction when the pressing force is applied to the second valve blade 330' by the moist air WG.

The humidifier 100 for a fuel cell according to another exemplary form of the present disclosure may include a guide hole 322' formed in the second valve 310' so as to communicate with the moist air supply port 112, and a second partition wall 360' disposed between the first supply hole 352' and the second supply hole 354' so as to divide an internal space of the pipe member 350' and having a second through hole 362'.

The second partition wall 360' is provided between the first supply hole 352' and the second supply hole 354' so as to divide the internal space of the pipe member 350' (into a third space and a fourth space, for example). The third space 350a' may communicate with the first supply hole 352', and the fourth space 350b' may communicate with the second supply hole 354'.

The guide hole 322' is formed to penetrate the second valve body 320' in the movement direction (the second direction) of the second valve body 320', and the present disclosure is not restricted or limited by the structure of the guide hole 322' and the number of guide holes 322'. For example, the guide hole 322' may be formed at a center of an end (a right end based on FIG. 8) of the second valve body 320'.

The second through hole 362' may have various structures capable of allowing the third space 350a' and the fourth space 350b' to communicate with each other. For example, the second through hole 362' may be formed to be disposed outside the guide hole 322' in a diameter direction of the guide hole 322'.

Further, the second through hole 362' may be selectively opened or closed by the second valve body 320'.

For example, the second through hole 362' may be closed in a state in which the end of the second valve body 320' is in close contact with the second partition wall 360' (e.g., in a state in which the first supply hole is entirely opened), and the second through hole 362' may be opened in a state in which the end of the second valve body 320' is spaced apart from the second partition wall 360' (e.g., in a state in which the first supply hole is closed or partially opened).

According to another exemplary form of the present disclosure, the humidifier 100 for a fuel cell may include a second elastic member 340' configured to elastically support the movement of the second valve body 320' relative to the pipe member 350'.

Various elastic members capable of elastically supporting the movement of the second valve body 320' relative to the pipe member 350' may be used as the second elastic member 340', and the present disclosure is not restricted or limited by the type and the structure of the second elastic member 340'.

For example, a typical spring may be used as the second elastic member 340', and the second elastic member 340' may be disposed between the second partition wall 360' and the second valve body 320' so as to be elastically compressible and restorable.

As described above, since the second valve body 320' is elastically supported by the second elastic member 340', the second valve body 320' may be automatically returned back to an initial position (e.g., the position at which the first supply hole is closed) by elastic force of the second elastic member 340' when the pressing force applied to the second valve blade 330' is eliminated (e.g., when the supply of the moist air is shut off).

The point in time at which the first supply hole 352' is opened or closed by the second valve 310' and the degree to which the first supply hole 352' is opened or closed by the second valve 310' may be variously changed based on required conditions and design specifications, and the present disclosure is not restricted or limited by the point in time at which the first supply hole 352' is opened or closed by the second valve 310' and the degree to which the first supply hole 352' is opened or closed by the second valve 310'.

For example, referring to FIG. 9, in the first operating condition (e.g., the low-output operating condition) of the fuel cell stack 20, the moist air WG generated in the fuel cell stack 20 may be supplied into the pipe member 350' with the first flow rate range Q1. When the flow rate of the moist air WG supplied into the pipe member 350' is within the first flow rate range Q1, the second valve body 320' may close the first supply hole 352'.

In addition, the second through hole 362' may be opened in the state in which the flow rate of the moist air WG supplied into the pipe member 350' is within the first flow rate range Q1 and the second valve body 320' closes the first supply hole 352'. Therefore, the moist air WG2 supplied to the pipe member 350' may be introduced into the fourth space 350b' (the space at the right side of the second partition wall based on FIG. 9) through the second through hole 362' and then discharged to the outside of the housing 110 through the moist air discharge port 114 via the second supply hole 354'.

As described above, since the flow rate (the first flow rate range) of the moist air WG supplied to the pipe member 350' is low in the first operating condition (e.g., the low-output operating condition) of the fuel cell stack 20, that is, since the pressing force applied to the second valve blade 330' is lower than the elastic force of the second elastic member 340', the first supply hole 352' is closed by the second valve body 320', and the inflow gas DG may be humidified only by the moist air WG2 supplied from a partial region of the housing 110 (a right end region of the housing based on FIG. 9) through the second supply hole 354', such that the amount of humidification of the inflow gas DG may be decreased.

As another example, referring to FIG. 10, in the second operating condition (e.g., the medium-output operating condition) of the fuel cell stack 20, the moist air WG generated in the fuel cell stack 20 may be supplied into the pipe member 350' with the second flow rate range Q2 higher than the first flow rate range Q1. When the flow rate of the moist air WG supplied into the pipe member 350' is within the second flow rate range Q2, the second valve body 320' may be moved in the second direction, such that a part of the first supply hole 352' may be partially opened.

As described above, in the second operating condition (e.g., the medium-output operating condition) of the fuel cell stack 20, the pressing force applied to the second valve blades 330' is higher than the elastic force of the second elastic member 340' because of the flow rate (the second flow rate range) of the moist air WG supplied to the pipe member 350', such that the first supply hole 352' may be partially opened, and the amount of humidification of the inflow gas DG may be increased as the supply amount and the supply area of the moist air WG supplied into the housing 110 are increased.

In addition, the second through hole 362' may remain in the opened state in the state in which the flow rate of the moist air WG supplied to the pipe member 350' is within the second flow rate range Q2 and the second valve body 320' partially open the first supply hole 352' (the state in which the second valve body is spaced apart from the second partition wall). Therefore, a part WG1 of the moist air WG supplied to the third space 350a' may be introduced into the housing 110 through the first supply hole 352', and the remaining part WG2 of the moist air WG supplied to the third space 350a' may be introduced into the fourth space 350b' through the second through hole 362' and then supplied into the housing 110 through the second supply hole 354'. As described above, the inflow gas DG may be humidified by both the moist air WG1 supplied into the housing 110 through the first supply hole 352' and the moist air WG2 supplied into the housing 110 through the second supply hole 354', such that the amount of humidification of the inflow gas DG may be increased.

As still another example, referring to FIG. 11, in the third operating condition (e.g., the high-output operating condition) of the fuel cell stack 20, the moist air WG generated in the fuel cell stack 20 may be supplied into the pipe member 350' with the third flow rate range Q3 higher than the second flow rate range Q2. When the flow rate of the moist air WG supplied into the pipe member 350' is within the third flow rate range Q3, the second valve body 320' may be moved in the second direction until the second valve body 320' comes into close contact with the second partition wall 360', such that the first supply hole 352' may be entirely opened.

As described above, in the third operating condition (e.g., the high-output operating condition) of the fuel cell stack 20, the pressing force applied to the second valve blades 330' is higher than the elastic force of the second elastic member 340' because of the flow rate (the third flow rate range) of the moist air WG supplied to the pipe member 350', such that the first supply hole 352' may be entirely opened, and the amount of humidification of the inflow gas DG may be further increased.

In addition, both the guide hole 322' and the second through hole 362' may be closed in the state in which the flow rate of the moist air WG supplied into the housing 110 is within the third flow rate range Q3 and the second valve body 320' open the entire first supply hole 352' (the state in which the state second valve body is in close contact with the second partition wall). Therefore, the entire moist air WG1' supplied to the third space 350a' may be introduced into the housing 110 through the first supply hole 352' which is farther from the moist air discharge port 114 than is the second supply hole 354', such that the supply amount of the moist air WG1' and the supply area (the area in which the humidification is performed by the moist air) may be increased, and as a result, the amount of humidification of the inflow gas DG may be further increased.

Meanwhile, when the operation of the fuel cell stack 20 is stopped, no moist air WG is supplied to the pipe member 350', such that the second valve body 320' may be automatically returned back to the initial position (e.g., the position at which the first supply hole is closed) by the elastic force of the second elastic member 340' (see FIG. 8).

While the exemplary forms have been described above, but the exemplary forms are just illustrative and not intended to limit the present disclosure. It can be appreciated by those skilled in the art that various modifications and alterations, which are not described above, may be made to the present exemplary form without departing from the intrinsic features of the present exemplary form. For example, the respective constituent elements specifically described in the exemplary forms may be modified and then carried out. Further, it should be interpreted that the differences related to the modifications and alterations are included in the scope of the present disclosure.

According to the exemplary forms of the present disclosure as described above, it is possible to obtain an advantageous effect of improving humidification performance and accurately adjusting the amount of humidification based on the operating condition of the fuel cell stack.

In particular, according to the exemplary forms of the present disclosure, it is possible to obtain an advantageous effect of adjusting the amount of humidification of the inflow gas, which is to be supplied to the fuel cell stack, based on the flow rate of the moist gas discharged from the fuel cell stack.

In addition, according to the exemplary forms of the present disclosure, it is possible to obtain an advantageous effect of accurately adjusting the amount of humidification of the inflow gas based on the operating condition without providing a separate bypass flow path inside (or outside) the humidifier.

In addition, according to the exemplary forms of the present disclosure, it is possible to obtain an advantageous effect of simplifying the structure and improving a degree of design freedom and spatial utilization.

In addition, according to the exemplary form of the present disclosure, it is possible to obtain an advantageous effect of improving performance and operational efficiency of a fuel cell.

What is claimed is:

1. A humidifier for a fuel cell, the humidifier comprising:
   a housing including:
      a moist air supply port through which moist air is supplied,
      a moist air discharge port through which the moist air is discharged, and
      an inflow gas supply port through which inflow gas is supplied;
   a humidification unit provided in the housing and configured to humidify the inflow gas by using the moist air; and
   a humidification amount adjusting unit configured to selectively adjust an amount of humidification of the inflow gas by the humidification unit based on a flow rate of the moist air supplied to the moist air supply port.

2. The humidifier of claim 1, wherein the humidification unit comprises:
   a cartridge casing provided in the housing, having, on a first side thereof, a first window through which the moist air is introduced, and having, on a second side thereof, a second window through which the moist air is discharged; and
   a humidification membrane provided in the cartridge casing and configured to allow the inflow gas to flow along the humidification membrane.

3. The humidifier of claim 2, wherein the humidification amount adjusting unit comprises a first valve configured to selectively open or close the first window based on the flow rate of the moist air.

4. The humidifier of claim 3, wherein the first valve comprises:
   a first valve body configured to be movable from a first position at which the first window is closed to a second position at which the first window is opened; and
   a first valve blade formed on the first valve body and configured to move the first valve body based on the flow rate of the moist air.

5. The humidifier of claim 4, wherein the moist air is supplied into the housing in a first direction, and the first valve body is configured to selectively open or close the first window while rectilinearly moving in a second direction that intersects the first direction.

6. The humidifier of claim 5, wherein the first valve blade is inclined with respect to the first direction, and
   wherein the first valve body is moved in the second direction when a pressing force is applied to the first valve blade by the moist air.

7. The humidifier of claim 4, wherein the first valve body is configured to close the first window when the flow rate of the moist air is within a first flow rate range, and
   wherein the first valve body is configured to open at least a part of the first window when the flow rate of the moist air is within a second flow rate range higher than the first flow rate range.

8. The humidifier of claim 7, further comprising:
   a first partition wall configured to divide an internal space of the housing into a first space communicating with the moist air supply port and a second space communicating with the moist air discharge port; and
   a first through hole formed in the first partition wall,
   wherein the first valve body is configured to selectively open or close the first through hole.

9. The humidifier of claim 8, wherein when the flow rate of the moist air is within the first flow rate range, the first through hole is opened in a state in which the first window is closed, and
   wherein when the flow rate of the moist air is within a third flow rate range higher than the second flow rate range, the first valve body is configured to close the first through hole in a state in which the first window is opened.

10. The humidifier of claim 4, further comprising:
    a guide protrusion formed on the cartridge casing in a movement direction of the first valve body; and
    a guide groove formed in the first valve body and configured to receive the guide protrusion so that the first valve body is movable.

11. The humidifier of claim 4, further comprising:
    a first elastic member configured to elastically support a movement of the first valve body relative to the cartridge casing.

12. The humidifier of claim 4, further comprising:
    an inlet hole formed in the first valve body,
    wherein the inlet hole is disposed to communicate with the first window when the first valve body is positioned at the first position.

13. The humidifier of claim 1, wherein the humidification unit comprises a humidification membrane provided in the housing and configured to allow the inflow gas to flow along the humidification membrane, and
    wherein the humidification amount adjusting unit comprises:
       a pipe member provided in the housing so as to communicate with the moist air supply port and having, on a first side thereof, a first supply hole that communicates with an internal space of the housing; and
       a second valve configured to selectively open or close the first supply hole based on the flow rate of the moist air.

14. The humidifier of claim 13, wherein the second valve comprises:

a second valve body provided to be movable from a third position at which the first supply hole is closed to a fourth position at which the first supply hole is opened; and a second valve blade formed on the second valve body and configured to move the second valve body based on the flow rate of the moist air.

15. The humidifier of claim 14, wherein the second valve body is configured to selectively open or close the first supply hole while rectilinearly moving in a direction in which the moist air is supplied into the pipe member.

16. The humidifier of claim 15, wherein the second valve blade is disposed in a direction that intersects a movement direction of the second valve body, and wherein the second valve body is moved when a pressing force is applied to the second valve blade by the moist air.

17. The humidifier of claim 14, further comprising:

a guide hole formed in the second valve and configured to communicate with the moist air supply port;

a second supply hole formed on a second side of the pipe member; and a second partition wall disposed between the first supply hole and the second supply hole and configured to divide an internal space of the pipe member and have a second through hole, wherein the second valve body is configured to selectively open or close the second through hole.

18. The humidifier of claim 17, wherein the second valve body is configured to close the first supply hole when the flow rate of the moist air is within a first flow rate range, and wherein the second valve body is configured to open at least a part of the first supply hole when the flow rate of the moist air is within a second flow rate range higher than the first flow rate range.

19. The humidifier of claim 18, wherein when the flow rate of the moist air is within the first flow rate range, the second through hole is opened in a state in which the first supply hole is closed, and wherein when the flow rate of the moist air is within a third flow rate range higher than the second flow rate range, the second valve body is configured to close the second through hole in a state in which the first supply hole is opened.

20. The humidifier of claim 14, further comprising:

a second elastic member configured to elastically support a movement of the second valve body relative to the pipe member.

* * * * *